US008989575B2

(12) United States Patent
Ye et al.

(10) Patent No.: US 8,989,575 B2
(45) Date of Patent: Mar. 24, 2015

(54) SIGNAL DETECTION METHOD AND OPTICAL SIGNAL RECEIVING SYSTEM

(75) Inventors: Haitao Ye, Shenzhen (CN);
Shuangyuan Wu, Shenzhen (CN);
Weijian Chen, Shenzhen (CN);
Yongzhong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/598,178

(22) Filed: Aug. 29, 2012

(65) Prior Publication Data
US 2013/0230317 A1     Sep. 5, 2013

(30) Foreign Application Priority Data

Aug. 30, 2011  (CN) .......................... 2011 1 0254161

(51) Int. Cl.
| | | |
|---|---|---|
| H04B 10/08 | (2006.01) | |
| H04B 17/00 | (2006.01) | |
| H04B 10/06 | (2006.01) | |
| H04B 10/61 | (2013.01) | |
| H04B 10/079 | (2013.01) | |
| H04B 10/63 | (2013.01) | |

(52) U.S. Cl.
CPC .......... H04B 10/61 (2013.01); H04B 10/07955 (2013.01); H04B 10/63 (2013.01)
USPC .............. 398/38; 398/202; 398/203; 398/204

(58) Field of Classification Search
CPC combination set(s) only.
See application file for complete search history.

(56) References Cited

U.S. PATENT DOCUMENTS

| | | | |
|---|---|---|---|
| 5,007,106 A * | 4/1991 | Kahn et al. ..................... | 398/203 |
| 7,414,234 B1 | 8/2008 | Teeter et al. | |
| 2002/0080475 A1 | 6/2002 | Cornelius et al. | |
| 2003/0138250 A1 | 7/2003 | Glynn | |
| 2005/0008369 A1* | 1/2005 | Winzer .......................... | 398/83 |
| 2008/0095539 A1 | 4/2008 | Khalouf et al. | |
| 2008/0253765 A1* | 10/2008 | Sugimura et al. .............. | 398/38 |

(Continued)

FOREIGN PATENT DOCUMENTS

| | | |
|---|---|---|
| CN | 1422465 A | 6/2003 |
| CN | 1576922 A | 2/2005 |

(Continued)

OTHER PUBLICATIONS

Generation of a CW Local Oscillator Signal Using a Stabilized Injection Locked Semiconductor Laser Jonah Massih Pezeshki, Doctor of Philosophy, 2007.*

(Continued)

Primary Examiner — Shi K Li
Assistant Examiner — Mina Shalaby
(74) Attorney, Agent, or Firm — Brinks Gilson & Lione

(57) ABSTRACT

The present invention provides a signal detection method, including: receiving, by a frequency mixer, wavelength division multiplexing signals and a local oscillator signal, where a wavelength of the local oscillator signal and a wavelength of a target signal in the wavelength division multiplexing signals are the same; a frequency mixer performs interference on the wavelength division multiplexing signals through the local oscillator signal to obtain a coherent signal formed by the local oscillator signal and the target signal; sending the coherent signal to a transimpedance amplifier for amplification to obtain a voltage signal; and obtaining the power of the target signal according to a power amplitude of the voltage signal.

5 Claims, 3 Drawing Sheets

(56) References Cited

U.S. PATENT DOCUMENTS

2009/0016727 A1    1/2009  Ueki et al.
2009/0097865 A1*   4/2009  Guckenberger .............. 398/202

FOREIGN PATENT DOCUMENTS

| CN | 101170360 A | 4/2008 |
| CN | 101241025 A | 8/2008 |
| CN | 101252395 A | 8/2008 |
| CN | 101634590 A | 1/2010 |

OTHER PUBLICATIONS

Extended European Search Report issued in corresponding European Patent Application No. 12182302.5, mailed Feb. 5, 2013.

* cited by examiner

SIGNAL DETECTION METHOD AND OPTICAL SIGNAL RECEIVING SYSTEM

CROSS-REFERENCE TO RELATED APPLICATION

This application claims priority to Chinese Patent Application No. 201110254161.X, filed on Aug. 30, 2011, which is hereby incorporated by reference in its entirety.

FIELD OF THE INVENTION

The present invention relates to a signal detection method and an optical signal receiving system in optical signal transmission.

BACKGROUND OF THE INVENTION

In the optical transmission field, for implementing optical signal transmission, optical signals of different wavelengths need to be multiplexed onto a fiber in a manner of wavelength division multiplexing, and then propagated in a form of wavelength division multiplexing signals. A receiving end extracts the optical signals of different wavelengths from the wavelength division multiplexing signals through a specific method, and then detects the strength of the optical signals and judges, according to the strength of the optical signals, the signal power or whether the signals are lost.

In early applications, an optical wavelength demultiplexer is generally used to separate the signals of different wavelengths from the wavelength division multiplexing signals transmitted in the fiber, and then strength of the signals of different wavelengths is measured.

With the development of technologies, a coherent receiving manner of wavelength division multiplexing signals emerges. The approach is that, optical signals of different wavelengths, which are sent by a local laser set at a receiving end, imposes interference onto the signals of different wavelengths in the wavelength division multiplexing signals. When the optical wavelength of the local laser is adjusted to coincide with the optical wavelength of the optical signal to be received, the optical signal to be received can be extracted from the wavelength division multiplexing signals. However, in this manner, the optical signal and a local oscillator signal are cohered in a frequency mixer and output together, and therefore, how to detect the power of the optical signal becomes a problem to be solved in the industry.

SUMMARY OF THE INVENTION

An embodiment of the present invention provides a signal detection method, including: receiving, by a frequency mixer, wavelength division multiplexing signals and a local oscillator signal, where a wavelength of the local oscillator signal and a wavelength of a target signal in the wavelength division multiplexing signals are the same; performing, by a frequency mixer, perform interference on the wavelength division multiplexing signals through the local oscillator signal, to obtain a coherent signal formed by the local oscillator signal and the target signal; sending the coherent signal to a transimpedance amplifier for amplification to obtain a voltage signal; and obtaining power of the target signal according to a power amplitude of the voltage signal, power of the local oscillator signal, and a gain of the transimpedance amplifier, or searching, according to the power amplitude of the voltage signal, a preset mapping function or mapping table to obtain the power of the target signal.

An embodiment of the present invention further provides a corresponding optical signal receiving system, including: a frequency mixer, configured to receive wavelength division multiplexing signals and a local oscillator signal, and perform interference on the wavelength division multiplexing signals through the local oscillator signal to obtain a coherent signal formed by the local oscillator signal and a target signal, where a wavelength of the local oscillator signal and a wavelength of the target signal are the same; a transimpedance amplifier, configured to amplify the coherent signal to obtain a voltage signal; and a signal detecting apparatus, configured to: detect a power amplitude of the voltage signal, and obtain power of the target signal according to the power amplitude of the voltage signal, power of the local oscillator signal, and a gain of the transimpedance amplifier; or search, according to the power amplitude of the voltage signal, a preset mapping function or mapping table to obtain the power of the target signal.

Through the signal detection method provided by the present invention, the power of the local oscillator signal and the power of the transimpedance amplifier are preset known values, and therefore, by extracting the target signals through the local oscillator signals of different wavelengths and measuring a power amplitude of the transimpedance amplifier, the power of the target signal can be obtained according to the measured power amplitude of the transimpedance amplifier.

An embodiment of the present invention provides another signal detection method, including: receiving, by a frequency mixer, wavelength division multiplexing signals and a local oscillator signal, where a wavelength of the local oscillator signal and a wavelength of a target signal in the wavelength division multiplexing signals are the same; performing, by a frequency mixer, interference on the wavelength division multiplexing signals through the local oscillator signal to obtain a coherent signal formed by the local oscillator signal and the target signal; sending the coherent signal to a transimpedance amplifier for amplification to obtain a voltage signal, and then sending the voltage signal to a variable-gain amplifier; and obtaining power of the target signal according to a feedback voltage signal of an output end of the variable-gain amplifier. In this signal detection method of the present invention, the target signal is extracted from the local oscillator signals of different wavelengths, and then the power of the target signal is obtained according to the feedback voltage signal of the variable-gain amplifier. Further, a corresponding optical signal receiving system is provided by the present invention.

BRIEF DESCRIPTION OF THE DRAWINGS

To make the technical solutions in embodiments of the present invention clearer, accompanying drawings used for the description of the embodiments of the present invention or the prior art are introduced briefly in the following. Apparently, the accompanying drawings described below are some embodiments of the present invention, and persons skilled in the art can derive other drawings according to these drawings without making creative efforts.

DETAILED DESCRIPTION OF THE EMBODIMENTS

The technical solutions in the embodiments of the present invention are described clearly and completely in the following in combination with the accompanying drawings. Evidently, the drawings and the detailed description are only part of rather than all of the embodiments of the present invention. All other embodiments, which can be derived by those skilled in the art based on the embodiments of the present invention without creative efforts, shall fall within the protection scope of the present invention.

Figure 1:
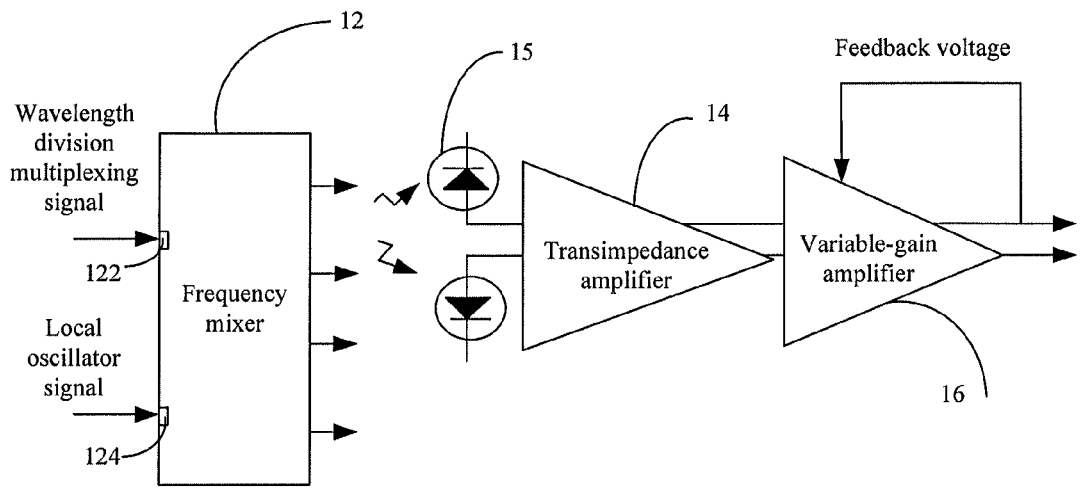
FIG. 1 is a schematic diagram of an optical signal receiving apparatus.

Referring to FIG. 1, FIG. 1 is a schematic diagram of an optical signal receiving apparatus, which includes a frequency mixer 12, a transimpedance amplifier 14 (Transimpedance Amplifier, TA for short), a photodiode 15 (Photodiode), and a variable-gain amplifier 16 (Variable-gain Amplifier).

The frequency mixer 12 is configured to extract optical signals of different wavelengths from wavelength division multiplexing signals (Wavelength Division Multiplexing Signal, WDM signal for short) by using local oscillator signals of different wavelengths. The frequency mixer 12 includes a wavelength division multiplexing signal receiving port 122 and a local oscillator signal receiving port 124. The wavelength division multiplexing signal receiving port 122 is configured to receive wavelength division multiplexing signals from a fiber. The local oscillator signal receiving port 124 is configured to receive a local oscillator signal, where a wavelength of the local oscillator signal is equal to a wavelength of a target signal to be extracted from the wavelength division multiplexing signals. In this embodiment, the local oscillator signals are laser signals which are sent by a laser and have the same power.

The frequency mixer 12 performs interference processing on the wavelength division multiplexing signals by using the local oscillator signal to obtain a coherent signal formed by the target signal and the local oscillator signal, and sends the coherent signal to the photodiode 15. The wavelength division multiplexing signals are formed by multiplexing multiple optical signals that include the target signal, and the local oscillator signal may be generated by a laser. After receiving the wavelength division multiplexing signals and the local oscillator signal, the frequency mixer 12 performs interference on the wavelength division multiplexing signals through the local oscillator signal. Because the local oscillator signal and the target signal have equal wavelengths and are both optical signals, the frequency mixer 12 can obtain the coherent signal formed by the local oscillator signal and the target signal after performing, through the local oscillator signal, interference on the wavelength division multiplexing signals. Because the coherent signal is formed by an optical signal, the coherent signal is still an optical signal after it is mixed by the frequency mixer 12. The photodiode 15 is configured to convert the optical signal into an electric signal, and then send the electric signal to a transimpedance amplifier 14.

A gain of the transimpedance amplifier 14 is constant. After receiving the coherent signal that has been converted into the electric signal, the transimpedance amplifier amplifies the coherent signal to obtain a voltage signal. The transimpedance amplifier 14 sends the voltage signal to the variable-gain amplifier 16. The variable-gain amplifier 16 amplifies the voltage signal according to a feedback signal fed back by its output end, and outputs a signal of a constant power. The output signal is buffered by a buffer, and then extracted by a device at a receiving end to obtain kinds of information. Accordingly, the embodiments of the present invention provide a signal detection method and apparatus for measuring the strength of the target signal in the optical signal receiving apparatus.

Figure 2:
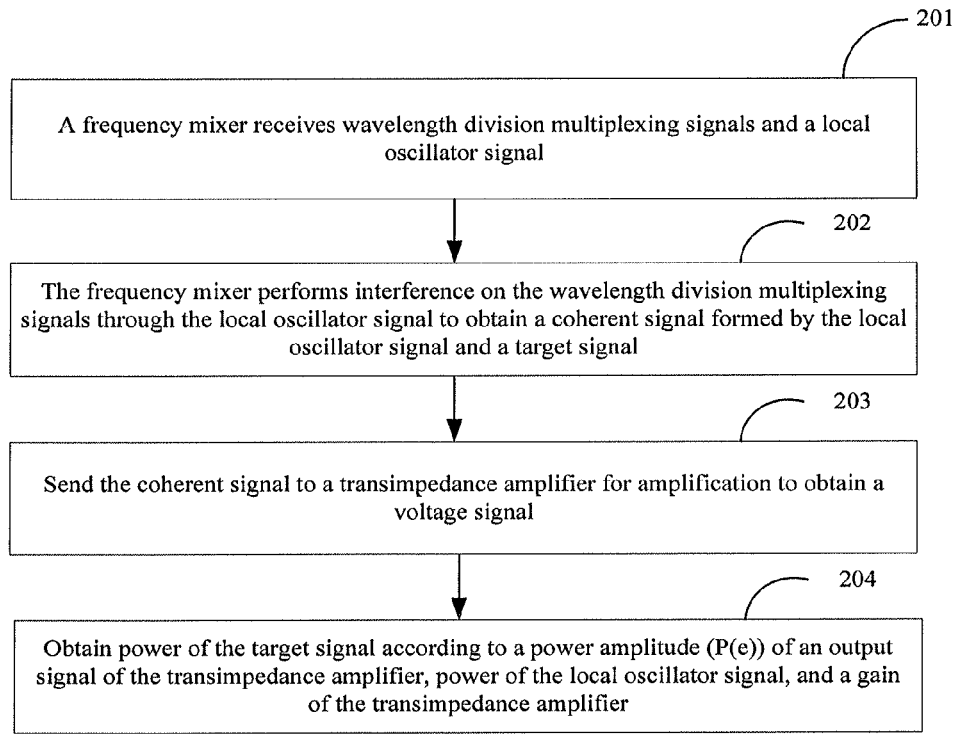
FIG. 2 shows a signal detection method according to an embodiment of the present invention.

Referring to FIG. 2, a signal detection method provided by an embodiment of the present invention includes:

Step 201: A frequency mixer receives wavelength division multiplexing signals and a local oscillator signal, where the wavelength division multiplexing signals are formed by multiplexing multiple signals of different wavelengths, and a wavelength of the local oscillator signal and a wavelength of a target signal to be extracted from the wavelength division multiplexing signals are the same.

The local oscillator signal may be an optical signal sent by a laser, and its power value is a fixed value.

Step 202: The frequency mixer performs interference on the wavelength division multiplexing signals through the local oscillator signal to obtain a coherent signal formed by the local oscillator signal and the target signal.

Step 203: Send the coherent signal to a transimpedance amplifier for amplification to obtain a voltage signal.

Step 204: The power of the target signal is obtained according to a power amplitude (P(e)) of an output signal of the transimpedance amplifier, the power of the local oscillator signal, and a gain of the transimpedance amplifier.

Further, in the embodiment of the present invention, the method of obtaining the power value of the target signal according to the power amplitude of the voltage signal, the gain of the transimpedance amplifier, and the power of the local oscillator signal may be executed according to formula (I):

$$S = \frac{\sqrt{2} \times P}{Lo \times Va} \quad (1)$$

In the formula, S is the power value of the target signal, P is the power amplitude of the voltage signal, Lo is the power value of the local oscillator signal, and Va is the gain of the transimpedance amplifier. When the construction of the transimpedance amplifier is determined, Va becomes a fixed value and does not vary with a change of an application environment. Specifically, according to a coherence principle, a power waveform function of a signal output through mixing by the frequency mixer is $$\frac{1}{\sqrt{2}} S \times Lo \times \cos[(W_s - W_{Lo})t + \phi(t)]$$

or $$\frac{1}{\sqrt{2}} S \times Lo \times \sin[(W_s - W_{Lo})t + \phi(t)],$$

where $(W_s - W_{Lo})$ indicates a phase difference between the target signal and the local oscillator signal. No matter which power waveform function is adopted, the power amplitude of the wavelength division multiplexing signals that are output through mixing by the frequency mixer is $$\frac{1}{\sqrt{2}} S \times Lo.$$

Because the gain of the transimpedance amplifier is fixed, the power of the target signal may be obtained through calculation according to the power amplitude of the output signal of the transimpedance amplifier, the gain of the transimpedance amplifier, and the power of the local oscillator signal.

Certainly, in an optional embodiment, the method of calculation may not be used, but the power of the target signal is obtained only according to a mapping function or by searching a table. That is because, according to formula (1), it can be seen that the power of the target signal is in inverse proportion to Lo and Va, Lo is the power value of the local oscillator signal and the value of Lo is fixed, and the value of Va is fixed when the architecture of the transimpedance amplifier is fixed. Therefore, after the architecture of the optical signal receiving apparatus is established, a mapping function or mapping table may be established between the power of the target signal and the power amplitude of the voltage signal by using a method of fitting multiple data points. In practical practice, by measuring the power amplitude of the voltage signal only, the power of the target signal can be obtained directly by using the mapping function or by searching the table. Therefore, step 204 in the embodiment of the present invention, that is, the obtaining of the power value of the target signal according to the power amplitude of the voltage signal, the gain of the transimpedance amplifier, and the power of the local oscillator signal, may include: searching, according to the power amplitude of the voltage signal, a preset mapping function or mapping table to obtain the power of the target signal.

By using the signal detection method provided in the embodiment of the present invention, the power of the local oscillator signal and the power of the transimpedance amplifier are preset known values, and therefore, only by extracting the target signals through the local oscillator signals of different wavelengths and measuring a power amplitude of the transimpedance amplifier, the power of the target signal can be obtained according to the power amplitude of the transimpedance amplifier.

Figure 3:
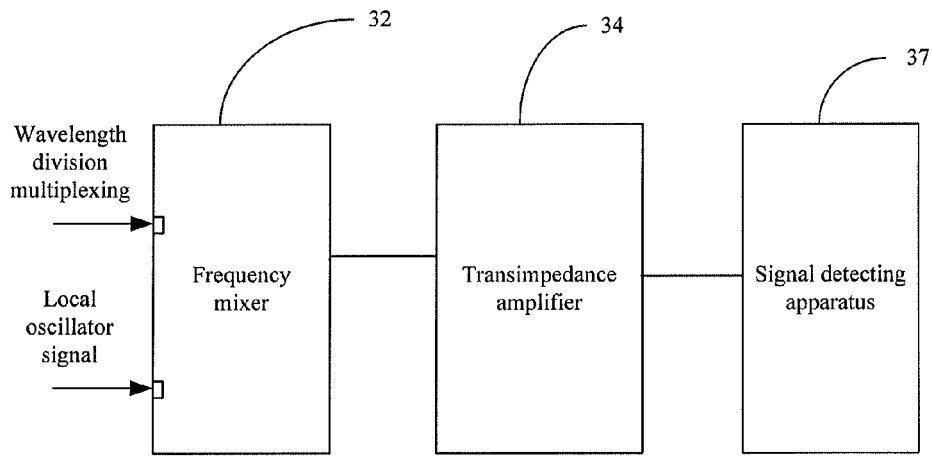
FIG. 3 shows an optical signal receiving system according to an embodiment of the present invention.

Referring to FIG. 3, an embodiment of the present invention provides an optical signal receiving system adaptive to the foregoing signal detection method. The system includes:

a frequency mixer 32, configured to receive wavelength division multiplexing signals and a local oscillator signal, and perform interference on the wavelength division multiplexing signals through the local oscillator signal to obtain a coherent signal formed by the local oscillator signal and a target signal, where a wavelength of the local oscillator signal and a wavelength of the target signal are the same, and the frequency mixer 32 is further configured to convert the coherent signal from an optical signal into an electric signal and send the electric signal to a transimpedance amplifier 34;

the transimpedance amplifier 34, configured to convert the coherent signal from a current signal into a voltage signal and amplify the voltage signal to obtain a voltage signal; and a signal detecting apparatus 37, configured to detect a power amplitude of the voltage signal, and according to the power amplitude of the voltage signal, and power of the local oscillator signal, obtain power of the target signal; or search, according to the power amplitude of the voltage signal, a preset mapping function or mapping table to obtain the power of the target signal.

Further, the signal detecting apparatus 37 includes a calculating module, configured to calculate and obtain the power of the target signal according to formula (1); or, the signal detecting apparatus includes a mapping module, configured to maintain a mapping function or mapping table of the mapping relationship between the power amplitude of the voltage signal, power of the local oscillator signal, and power of the target signal; and a searching module, configured to use the mapping function or mapping table to search for the power of the target signal according to the power amplitude of the voltage signal and the power of the local oscillator signal.

Figure 4:
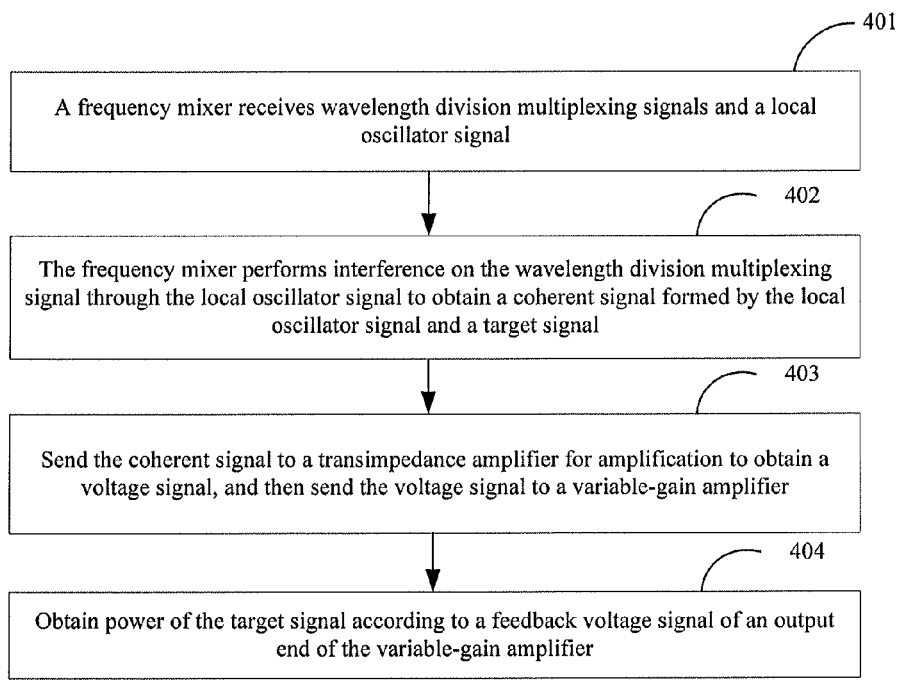
FIG. 4 shows a detection method according to another embodiment of the present invention.

Referring to FIG. 4, another embodiment of the present invention provides a signal detection method, including:

Step 401: A frequency mixer receives wavelength division multiplexing signals and a local oscillator signal, where the wavelength division multiplexing signals are formed by multiplexing multiple signals of different wavelengths, and a wavelength of the local oscillator signal and a wavelength of a target signal to be extracted from the wavelength division multiplexing signals are the same.

The local oscillator signal may be an optical signal sent by a laser.

Step 402: The frequency mixer performs interference on the wavelength division multiplexing signals through the local oscillator signal to obtain a coherent signal formed by the local oscillator signal and the target signal.

Step 403: Send the coherent signal to a transimpedance amplifier for amplification to obtain a voltage signal, and then send the voltage signal to a variable-gain amplifier.

Step 404: Obtain power of the target signal according to a feedback voltage signal of an output end of the variable-gain amplifier.

Specifically, the transimpedance amplifier provides a constant gain for an input signal, and the variable-gain amplifier performs variable-gain adjustment to the input signal according to a feedback voltage signal of its output end to achieve constant output. Therefore, Output of the variable-gain amplifier=power of the coherent signal×gain of the transimpedance amplifier×gain of the variable-gain amplifier.

The output of the variable-gain amplifier keeps constant under the regulation of the feedback voltage signal of the output end, and the gain of the transimpedance amplifier is also fixed. Therefore, the gain of the variable-gain amplifier is in inverse proportion to the power of the coherent signal. Accordingly, it can be seen from the power waveform function of the coherent signal output by the frequency mixer that, the power of the coherent signal is in direct proportion to the power of the target signal. Therefore, a one-to-one mapping relationship should exist between the gain of the variable-gain amplifier and the power of the target signal. Therefore, a one-to-one mapping relationship also exists between the power of the target signal and the variable-gain amplifier. Once the target signal of the same wavelength as the local oscillator signal of a specific wavelength is extracted through the local oscillator signal, the variable-gain amplifier may generate a corresponding gain to ensure that the output power remains unchanged. That is, target signals of different wavelengths correspond to different gains of the variable-gain amplifier. The gain of the variable-gain amplifier is also in inverse proportion to the feedback voltage of the output end of the variable-gain amplifier. Therefore, the target signal of the specific wavelength corresponds to a specific feedback voltage of the output end of the variable-gain amplifier. Depending on such relationships, as long as a mapping function, a mapping curve, or a mapping table between the power of the target signals of different wavelengths and the feedback voltages is obtained by repeated measurement, the power of the target signal may be obtained directly according to the feedback voltage of the variable-gain amplifier.

Figure 5:
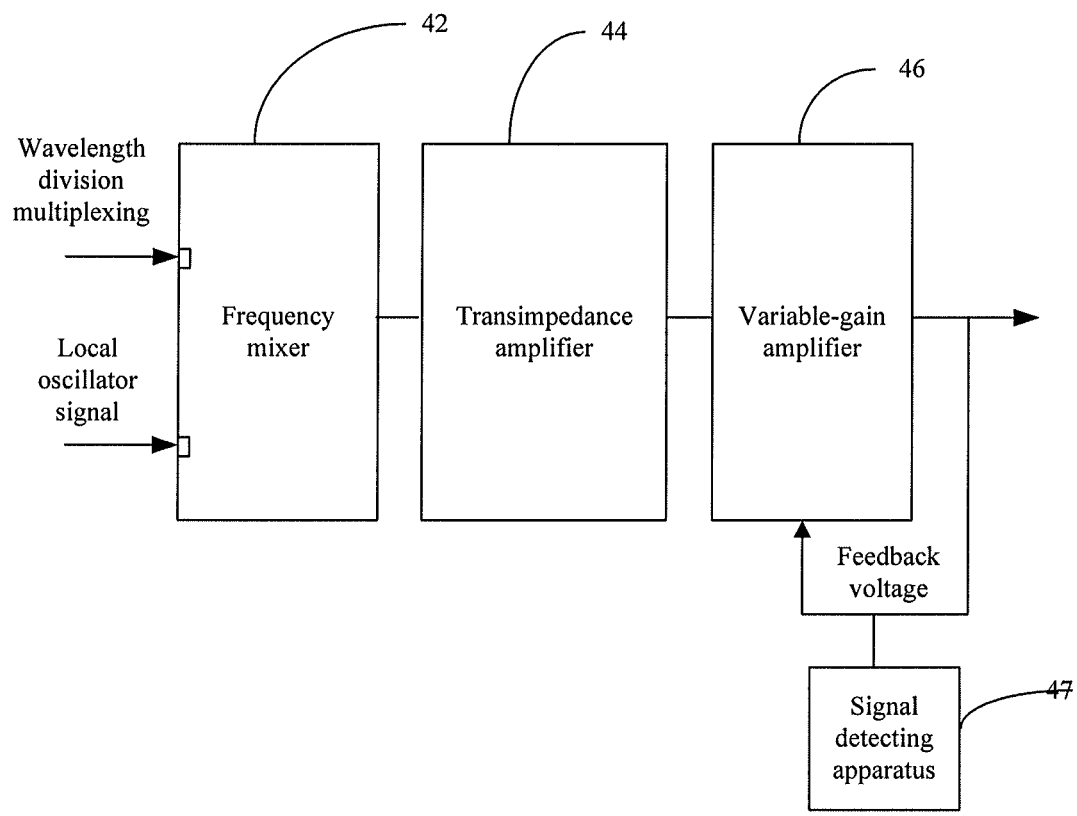
FIG. 5 shows an optical signal receiving system according to another embodiment of the present invention.

Referring to FIG. 5, an embodiment of the present invention provides an optical signal receiving system that applies the foregoing signal detection method, The system includes:

a frequency mixer 42, configured to receive wavelength division multiplexing signals and a local oscillator signal, and perform interference on the wavelength division multiplexing signals through the local oscillator signal to obtain a coherent signal formed by the local oscillator signal and a target signal, where a wavelength of the local oscillator signal and a wavelength of the target signal are the same, and the frequency mixer 42 is further configured to convert the coherent signal from an optical signal into an electric signal and send the electric signal to a transimpedance amplifier 44;

the transimpedance amplifier 44, configured to convert the coherent signal from a current signal into a voltage signal and amplify the voltage signal to obtain a voltage signal;

a variable-gain amplifier 46, configured to amplify the voltage signal according to a feedback voltage of an output end of the variable-gain amplifier 46, and generate an output signal of constant power; and a signal detecting apparatus 47, configured to obtain power of the target signal according to the feedback voltage.

In the signal detection method and the optical signal receiving system provided in the embodiment of the present invention, the power of the target signal is obtained according to the signal or feedback that is generated in the process of amplifying the output signal of the frequency mixer, which helps the operator determine the optical power of the wavelength division multiplexing signals according to the power of the target signal, and may detect the optical power of the target signal in a scenario without an optical wavelength demultiplexer (colorless), and therefore the application scope is extended.

Through the description of the foregoing implementation manners, those skilled in the art may clearly understand that the present invention may be implemented in a manner of software plus a necessary universal hardware platform, or by hardware only, but in most cases, the former is an exemplary implementation manner. Based on such understanding, the essence of the technical solutions of the present invention or the part that makes contribution to the prior art may be embodied in a manner of a software product. The software product may be stored in a storage medium such as a ROM/RAM, a magnetic disk, or an optical disk, and includes several instructions that make a computer device (for example, personal computer, server, or network device) execute the methods described in the embodiments of the present invention or part of the embodiment.

The foregoing description is only some exemplary embodiments of the present invention. It should be noted that those skilled in the art can make several improvements and modifications without departing from the principle of the invention, and these improvements and modifications shall also fall in the protection scope of the present invention.

What is claimed is:

1. A signal detection method, comprising:
receiving, by a frequency mixer, wavelength division multiplexing signals and a local oscillator signal, wherein a wavelength of the local oscillator signal and a wavelength of a target signal in the wavelength division multiplexing signals are the same;
performing, by the frequency mixer, interference on the wavelength division multiplexing signals through the local oscillator signal to obtain a coherent signal formed by the local oscillator signal and the target signal;
sending the coherent signal to a transimpedance amplifier for amplification to obtain a voltage signal, and then sending the voltage signal to a variable-gain amplifier; and
obtaining power of the target signal according to a feedback voltage signal of an output end of the variable-gain amplifier and a formula $$S = \frac{\sqrt{2} \times P}{Lo \times Va},$$

wherein S is the power of the target signal, P is the power amplitude of the voltage signal, Lo is a power value of the local oscillator signal, and Va is the gain of the transimpedance amplifier.

2. The signal detection method according to claim 1, wherein:
the obtaining the power of the target signal according to the feedback voltage signal of the output end of the variable-gain amplifier comprises:
according to voltage of the feedback voltage signal of the output end of the variable-gain amplifier, searching a preset mapping function, mapping curve or mapping table to obtain the power of the target signal.

3. The signal detection method according to claim 1, further comprising:
converting the coherent signal from an optical signal into an electric signal, and then sending the coherent signal converted into the electric signal to the transimpedance amplifier for amplification.

4. An optical signal receiving system, comprising:
a frequency mixer, configured to receive wavelength division multiplexing signals and a local oscillator signal, and perform interference on the wavelength division multiplexing signals through the local oscillator signal to obtain a coherent signal formed by the local oscillator signal and a target signal, wherein a wavelength of the local oscillator signal and a wavelength of the target signal are the same;
a transimpedance amplifier, configured to convert the coherent signal from a current signal into a voltage signal and amplify the voltage signalto obtain a amplified voltage signal;
a variable-gain amplifier, configured to amplify the amplified voltage signal according to a feedback voltage of an output end of the variable-gain amplifier, and generate an output signal of constant power; and
a signal detecting apparatus, configured to obtain power of the target signal according to a formula $$S = \frac{\sqrt{2} \times P}{Lo \times Va},$$

wherein S is the power of the target signal, P is the power amplitude of the voltage signal, Lo is a power value of the local oscillator signal, and Va is the gain of the transimpedance amplifier.

5. The optical signal receiving system according to claim 4, further comprising:
a photodiode, configured to convert the coherent signal from an optical signal into an electric signal, and then send the coherent signal which is converted into the electric signal to the transimpedance amplifier for amplification.

* * * * *